US009258340B2

(12) United States Patent  
Ervine

(10) Patent No.: US 9,258,340 B2  
(45) Date of Patent: Feb. 9, 2016

(54) SECURE DIGITAL REMEDIATION SYSTEMS AND METHODS FOR MANAGING AN ONLINE REPUTATION

(71) Applicant: Jeff Ervine, New York, NY (US)

(72) Inventor: Jeff Ervine, New York, NY (US)

(73) Assignee: IPA (Cayman) Limited, George Town (KY)

( * ) Notice: Subject to any disclaimer, the term of this patent is extended or adjusted under 35 U.S.C. 154(b) by 65 days.

(21) Appl. No.: 13/921,628

(22) Filed: Jun. 19, 2013

(65) Prior Publication Data

US 2013/0339447 A1 Dec. 19, 2013

Related U.S. Application Data

(60) Provisional application No. 61/661,568, filed on Jun. 19, 2012.

(51) Int. Cl.
| | |
|---|---|
| *H04L 29/06* | (2006.01) |
| *H04L 12/58* | (2006.01) |
| *G06Q 30/06* | (2012.01) |
| *G06Q 50/00* | (2012.01) |

(52) U.S. Cl.
CPC .............. *H04L 65/403* (2013.01); *H04L 51/32* (2013.01); *H04L 63/105* (2013.01); *G06Q 30/0613* (2013.01); *G06Q 50/01* (2013.01)

(58) Field of Classification Search
CPC ..... H04L 51/32; G06Q 30/0613; G06Q 50/01
See application file for complete search history.

(56) References Cited

U.S. PATENT DOCUMENTS

| 5,895,450 | A | 4/1999 | Sloo |
| 7,680,675 | B1 | 3/2010 | Kwun et al. |
| 8,250,025 | B2* | 8/2012 | Ferraro ................. G06Q 10/10 707/602 |
| 8,656,095 | B2* | 2/2014 | Coulter .......................... 711/112 |
| 8,849,911 | B2* | 9/2014 | Rubinstein et al. ........... 709/204 |
| 2001/0044729 | A1* | 11/2001 | Pomerance ...................... 705/1 |
| 2002/0116247 | A1* | 8/2002 | Tucker .................. G06Q 30/06 709/224 |
| 2005/0210268 | A1 | 9/2005 | Duke et al. |

(Continued)

FOREIGN PATENT DOCUMENTS

| WO | WO2013192312 | 12/2013 |
| WO | WO2014185981 | 11/2014 |

OTHER PUBLICATIONS

Internation Search Report and Written Opinion of the International Searching Authority mailed Aug. 26, 2013 in Patent Cooperation Treaty Application No. PCT/US2013/046585, filed Jun. 19, 2013.

(Continued)

*Primary Examiner* — Lashonda Jacobs  
(74) *Attorney, Agent, or Firm* — Carr & Ferrell LLP

(57) ABSTRACT

Secure digital remediation methods and systems are provided for managing a reputation. A method for managing a reputation includes receiving a complaint from a victim regarding an unfavorable item published by one or more third parties, extracting information from the unfavorable item, and providing a communication to the one or more third parties of the complaint including the information, the communication requesting a response from the one or more third parties. The method also includes scoring the unfavorable item on a severity scale based on the information, responses to queries and/or a ruleset to produce a severity score, the ruleset including instructions for responding to the complaint based on the severity score.

30 Claims, 6 Drawing Sheets

(56) References Cited

U.S. PATENT DOCUMENTS

| | | | | |
|---|---|---|---|---|
| 2006/0010080 | A1* | 1/2006 | Weild | 705/80 |
| 2006/0253580 | A1 | 11/2006 | Dixon et al. | |
| 2007/0061338 | A1* | 3/2007 | Nyland | G06Q 10/00 |
| 2007/0120688 | A1* | 5/2007 | Jackson | G06F 17/3089 340/573.1 |
| 2007/0208940 | A1* | 9/2007 | Adelman | G06Q 10/107 713/168 |
| 2008/0027746 | A1* | 1/2008 | Exall | G06Q 10/00 705/317 |
| 2008/0282324 | A1* | 11/2008 | Hoal | 726/3 |
| 2009/0106697 | A1 | 4/2009 | Ward et al. | |
| 2009/0113040 | A1* | 4/2009 | Zalewski | 709/224 |
| 2009/0132689 | A1* | 5/2009 | Zaltzman | G06Q 10/00 709/223 |
| 2009/0235084 | A1 | 9/2009 | Ferraro et al. | |
| 2009/0248623 | A1* | 10/2009 | Adelman | H04L 12/585 |
| 2009/0254499 | A1* | 10/2009 | Deyo | G06Q 10/10 706/12 |
| 2010/0023815 | A1* | 1/2010 | Hasegawa et al. | 714/57 |
| 2010/0023882 | A1* | 1/2010 | Jackson | G06Q 10/00 715/760 |
| 2010/0042931 | A1* | 2/2010 | Dixon et al. | 715/738 |
| 2010/0174722 | A1* | 7/2010 | Carteri | 707/748 |
| 2011/0016056 | A1 | 1/2011 | Hargroder | |
| 2011/0041058 | A1* | 2/2011 | Butler et al. | 715/709 |
| 2012/0035977 | A1 | 2/2012 | Wells et al. | |
| 2012/0151047 | A1* | 6/2012 | Hodges | G06F 21/604 709/224 |
| 2013/0124192 | A1* | 5/2013 | Lindmark et al. | 704/9 |
| 2013/0138536 | A1 | 5/2013 | Koh et al. | |
| 2013/0151609 | A1* | 6/2013 | Rubinstein | H04L 51/32 709/204 |
| 2013/0218999 | A1* | 8/2013 | Martin | 709/206 |
| 2014/0040154 | A1* | 2/2014 | Webb | 705/325 |
| 2014/0250196 | A1* | 9/2014 | Joao | 709/206 |
| 2014/0280584 | A1 | 9/2014 | Ervine | |
| 2014/0304341 | A1* | 10/2014 | Hsu | 709/206 |
| 2015/0234837 | A1* | 8/2015 | Rowe | G06F 17/3087 707/769 |

OTHER PUBLICATIONS

Internation Search Report and Written Opinion of the International Searching Authority mailed Dec. 17, 2014 in Patent Cooperation Treaty Application No. PCT/US2014/000118, filed May 14, 2014.

* cited by examiner

SECURE DIGITAL REMEDIATION SYSTEMS AND METHODS FOR MANAGING AN ONLINE REPUTATION

CROSS-REFERENCE TO RELATED APPLICATION

This Non-Provisional Patent Application claims priority benefit of U.S. Provisional Patent Application Ser. No. 61/661,568, filed Jun. 19, 2012, titled "Internet Protection Act Online Dispute Resolution System and Method" which is hereby incorporated by reference herein in its entirety including all references cited therein.

FIELD OF THE INVENTION

The present invention relates to systems and methods for asserting influence over unfavorable online content. More particularly, the present invention relates to systems and methods for managing an online reputation.

BACKGROUND

Usage of the Internet has become a daily occurrence for many people around the world. Internet usage has been driven to higher and more powerful levels by the likes of major search engines such as Google™ and Yahoo!™. Driving Internet usage even higher has been the advent and rise of social networking sites, such as Facebook™ and Myspace™, as well as personal blogging sites such as Wordpress™, and microblogging sites such as Twitter™ and Tumblr™. Global users of the Internet post information and content daily to such social networking and blogging sites, and other users of the Internet may find information posted using search engines.

As the Internet has grown, social media has grown along with it. No longer bounded by distance and geography, users of the Internet are free to immediately communicate with anyone, anywhere and at any time. However, with this new means for almost instantaneous communication comes a very real price.

Almost all content that is published online, be it a letter to a friend, a photo shared on a social networking site, or a video published and then linked in a blog post, is immortalized online. Without direct action, such published information is available 24 hours a day, seven days a week, 365 days a year, forever. As un-moderated as the Internet is currently, a problem exists when the information published is unfavorable, damaging, bullying or even defamatory to a person.

Unfavorable information that is published online can be quite damaging to a person. Lies, half-truths and misstated information can have real and serious impacts on a victim, from the loss of a job, the ending of a marriage or other civil union, and even eventual suicide or other self-harming activities.

Attempting to have the unfavorable content removed from the Internet can be a daunting task. One conventional method is a lawsuit, which can be cumbersome, slow and expensive. In suing a publisher of the unfavorable information for defamation or other civil torts, a victim will often need to hire an attorney, pay court and service fees, and wait years for an ultimate resolution of the matter. During this period that the lawsuit is ongoing, the unfavorable information is still online, accessible by anyone with Internet access.

SUMMARY OF THE INVENTION

According to exemplary embodiments of the invention, the present technology provides systems and methods for managing an online reputation. The system may include a complaint interface including a victim entity identification section, an unfavorable item identification section, and a third party publisher identification section. The system may also include an extraction module, executable by a processor, for extracting information from an unfavorable item, as well as a communication module for communicating to a third party a complaint including the extracted information.

The system herein described may also include a scoring module for scoring the unfavorable item on a severity scale based upon the extracted information and a ruleset. The scoring of the unfavorable item may result in a severity score, and the ruleset may also include instructions for responding to the complaint based on the severity score.

The system herein described may also include a modification module for modifying the communication to the third party. The modification of the communication may be based on the severity score of the extracted information as determined by the scoring module. The modification module may also be used to modify the ruleset based on outcome evaluations of prior complaints, which may be generated automatically.

The communication module in the system described may provide options for response from a third party. These options include removing the unfavorable item, denying that the unfavorable item was published by the third party, and/or asserting that the unfavorable item is a true and correct statement. The system may also include an arbitration module that would allow an independent arbitrator to arbitrate the complaint to a resolution. The communication module may further communicate with an Internet Service Provider (or other digital communication system, or a third party), the complaint and a result of the arbitration.

The system may also include an output interface that allows a certificate of vindication (also referred to as an indication of vindication) to be outputted to the victim when the arbitration performed through the arbitration module results in a decision for the victim.

A method for managing a reputation is also provided. The method includes receiving a complaint from a victim regarding an unfavorable item published by a third party; extracting information (for instance parsing a posting) from the unfavorable item; and providing a communication to the third party of the complaint including the information. The communication requests a response from the third party.

The method may further include a step where the unfavorable item is scored on a severity scale based on the information extracted from the unfavorable item and a ruleset. The ruleset includes instructions for responding to the complaint based on the severity score.

The method may further include modifying the communication to the third party based on the severity score of the information. The invention may also modify the ruleset based on the evaluations of the outcomes of prior complaints that have used the systems and methods described. These outcome evaluations may be generated automatically.

The method described may also allow for the modification of the communication that is sent to the third party to provide options to the third party in ways to respond to the communication. These options may include removing the unfavorable item, denying the unfavorable item was published by the third party, and/or asserting the unfavorable item is true.

The method may also allow for arbitrating the complaint by an objective arbitrator. Further, the method may allow for a communication to an Internet Service Provider in which the communication includes at least the complaint and a result of the arbitration.

After arbitration, the method may further include outputting a certificate of vindication to the victim when the arbitration of the complaint results in a decision for the victim.

In the system and method described above, the extracted information may include at least one of a picture, a video segment, a text segment, and an audio segment.

These and other advantages of the present technology will be apparent when reference is made to the accompanying drawings and the following description.

DETAILED DESCRIPTION OF EXEMPLARY EMBODIMENTS

Figure 1:
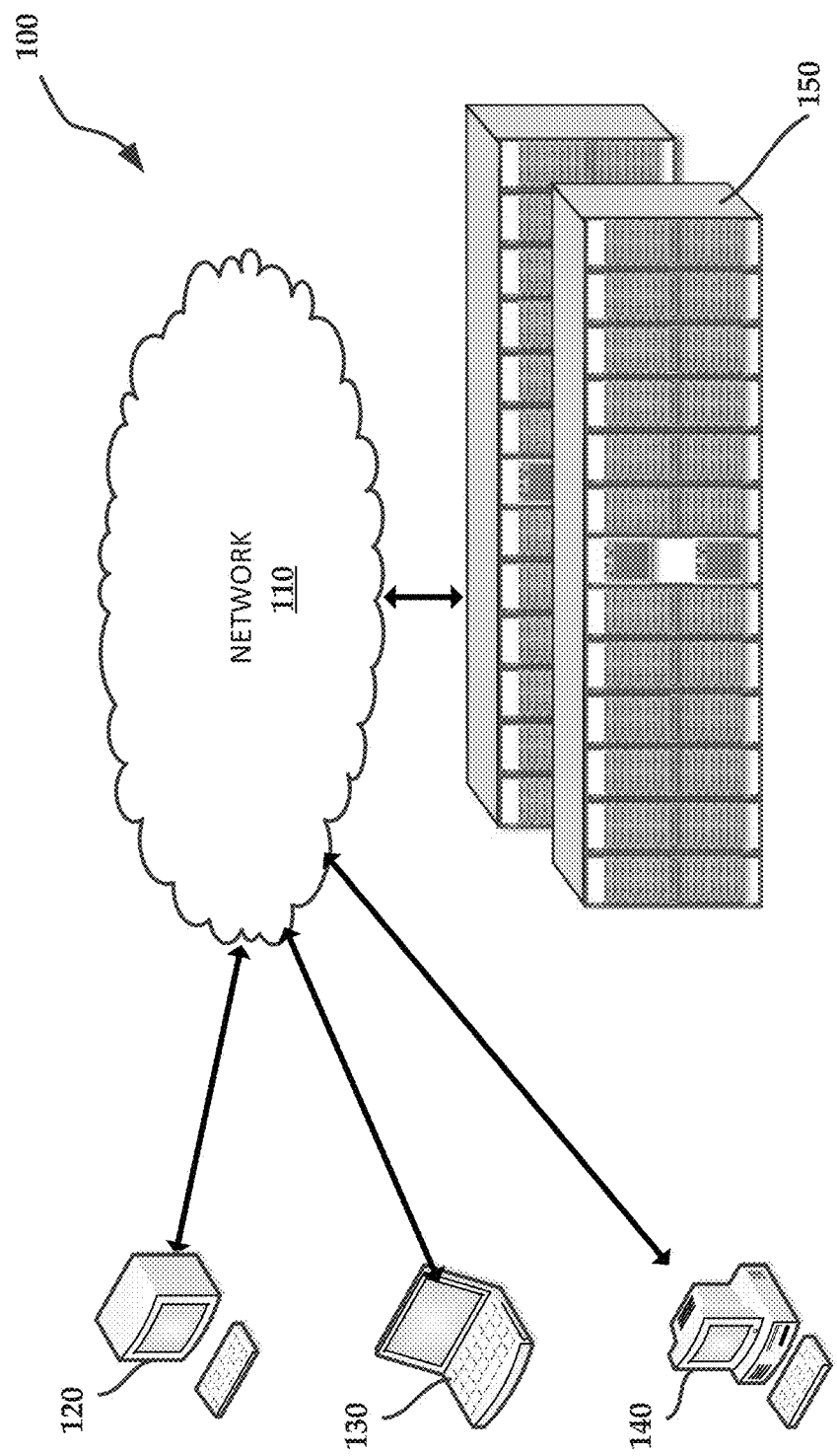
FIG. 1 is a diagram illustrating an exemplary embodiment of a cloud-based data storage and processing system.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

A victim is defined herein as a person subject to an attack, disparaging pictures, words or other material, and a person acting on behalf of a victim, for example a parent, guardian, relative of a deceased person or persons, member of a family. Additionally, a victim may be a product, a corporation, or an inanimate object. Victim as used herein may refer to a victim or victims, and/or a victim's representative.

A digital service provider is alternatively referred to as an Internet Service Provider (ISP), and is defined herein as any digital communication system, including but not limited to an ISP, a mobile telephone system (for text communications), a web application, and/or any other digital communication system. Additional systems falling within the definition of a digital service provider are blog hosts, microblogging hosts and/or sites (e.g. Twitter™), Tumblr™ feeds, and/or any other digital communication system.

The present technology provides systems and methods for managing an online reputation from being tarnished and/or harmed by unfavorable material that is published online by various third party publishers. The present technology provides systems and methods that allow a victim of such published unfavorable material to respond effectively to the publication of the unfavorable material. Presently, a victim of such published unfavorable material currently has very few options when such unfavorable material is published about them, and often must resort to archaic methods such as lawsuits or other legal proceedings.

A website according to exemplary embodiments provides an opportunity for victims of internet-published unfavorable material to vindicate themselves from the unfavorable material. This unfavorable material may be of many natures, including material that embarrasses, harasses, bullies, defames or slanders a victim.

The online platform may be referred to as a Digital Remediation Platform, an Internet Protection Authority (IPA), or alternatively a Digital Protection Authority (DPA). The online platform may allow victims of unfavorable material published online to have the ability, in an efficient manner, to remove and suppress the unfavorable material about themselves and/or others without having to go through the traditional judicial process. Building on that need, the website and online platform may offer an alternative to quickly resolve the problems associated with unfavorable material published online. The website may be secured with log-in requirements including passwords, as well as encryption. In this manner, data safety may be ensured. Additionally, the system provided herein may be "closed" in that a user may have to log-in to view communications from the system, rather than receiving emails or other "open" communications.

Work flow in the exemplary system may proceed as follows. First, a game aspect of the system may be created, which may include the name "Digital Advocate" or "Scarlet Advocate" or "Scarlet Army". Second, direct or standard use by a victim may include creating an identification (ID) and filing a case to remove defamatory content about oneself. Alternatively, indirect user and/or a digital advocate, for example a friend, relative, champion or "Good Samaritan", logs on to the system and creates an account and files a case on behalf of a victim. In this case, the digital advocate may have their own avatar, handle and/or ID. Next, the digital advocate may receive points for removals representing digital wins or good deeds, and may have their own statistics page. In this manner, the digital advocate may accumulate digital wins and may increase a rating (for example, white belt to a black belt, or a private to a general). Victims can enlist the help of digital advocates to help them obtain their goal of removal of the defamatory content. In further embodiments, crowd sourcing may be utilized to form a digital posse to identify a poster and all relevant defamatory content. In this manner, digitally based help is enlisted to address a digitally based problem (defamation/invasion of privacy) to the benefit of a real victim with the ultimate goal of removal of the content.

A digital questionnaire methodology may be utilized in certain exemplary embodiments. Questions may be sequenced based on evidence provided and/or described, as well as previous answers. Proprietary algorithms may be used, and may be based on evidence and a proprietary DPA Digital Defamation and Privacy Code, to determine the type and sequencing of questions. A severity score may be produced based on the evidence and answers to the questions. Finally, a customized Strongly Worded Letter may be automatically recommended based on the answers to questions, the evidence provided, and the resultant severity score.

A pre-arbitration process may be provided including a log-in by a Pre-Arb Arbitrator who reviews answers and evidence included in the digital questionnaire. The Pre-Arb Arbitrator may review severity score and an automatic Arbitration Success Score, which may be an automated evaluation of the claim. The score may be based on a DPA International Defamation and Invasion of Privacy Codification. The Pre-Arb Arbitrator may review evidence and/or facts to confirm the existence of the claim, and may survey and/or send a victim a standard set of questions. The Pre-Arb Arbitrator, based on evidence and any survey responses from the victim, may either recommend, or not recommend, DPA arbitration.

The present invention may also provide a mobile application interface and/or downloadable mobile application that may access the systems and methods that are stored online.

The present invention may be implemented through agreements with search engines, legislation and/or non-governmental organizations. The present invention may be integrated with traditional law enforcement, arbitration and/or civil actions.

The present invention automates the process of accepting a complaint related to unfavorable material about a victim that is published online, preparing and sending a communication to a suspected third party publisher, and populating a database with information relating to the complaint and any publisher information. The present invention provides an authority to receive a response to the complaining communication and an avenue for the victim to further pursue the complaint if the publisher denies fault and/or fails to as promised in their communication. The victim may populate the complaint either through a traditional web browser, or through other avenues such as through a mobile application interface.

Once populated, the complaint may automatically pull information from the database to facilitate the process. The publisher of the unfavorable material may be provided with an opportunity to respond to the complaint, possibly regardless of whether they have responded to the complaining communication. The complaint and response may be electronically and automatically submitted to an arbitrator for a determination of culpability.

The arbitrator may determine that there is no culpability on the part of the publisher of the unfavorable information, or any party. If such is the situation, no further action may be taken, and any fees may be assessed to the complaining party.

The arbitrator may alternatively determine that the publisher, or a party related to the publisher, is culpable. In such a situation, the publisher, the publisher's Internet Service Provider (ISP), and/or any search engines that display the search results containing the unfavorable information may be ordered to take down the unfavorable material, and/or cease displaying a link to the unfavorable material if the publisher fails to remove the unfavorable material.

FIG. 1 illustrates cloud-based data storage and processing system 100 that may be used in implementing the present technology. Cloud-based data storage and processing system 100 includes datacenter 150 communicatively coupled to network 110. Datacenter 150 may be configured to store instructions and data associated with the systems and methods of the present technology, such as a database containing complaints and results of complaints. Network 110 may be a wide-area network (WAN), a local area network (LAN), the Internet, and/or any other appropriate network.

Customers/victims may access cloud-based data storage and processing system 100 by using customer terminal 140, which may be a computer, laptop computer, mobile device or any other system used to communicate via network 110. Administrators of the present technology may access the cloud-based data storage and processing system 100 by using administrator terminal 130, which may be a computer, laptop computer, mobile device or any other system used to communicate via network 110. Administrators may include, but are not limited to, arbitrators, employees and officers. Publishers of the present technology may access the cloud-based data storage and processing system 100 by using publisher terminal 120, which may be a computer, laptop computer, mobile device or any other system used to communicate via network 110. Publishers may include, but are not limited to, publishers of unfavorable information, ISPs and search engines.

Figure 2:
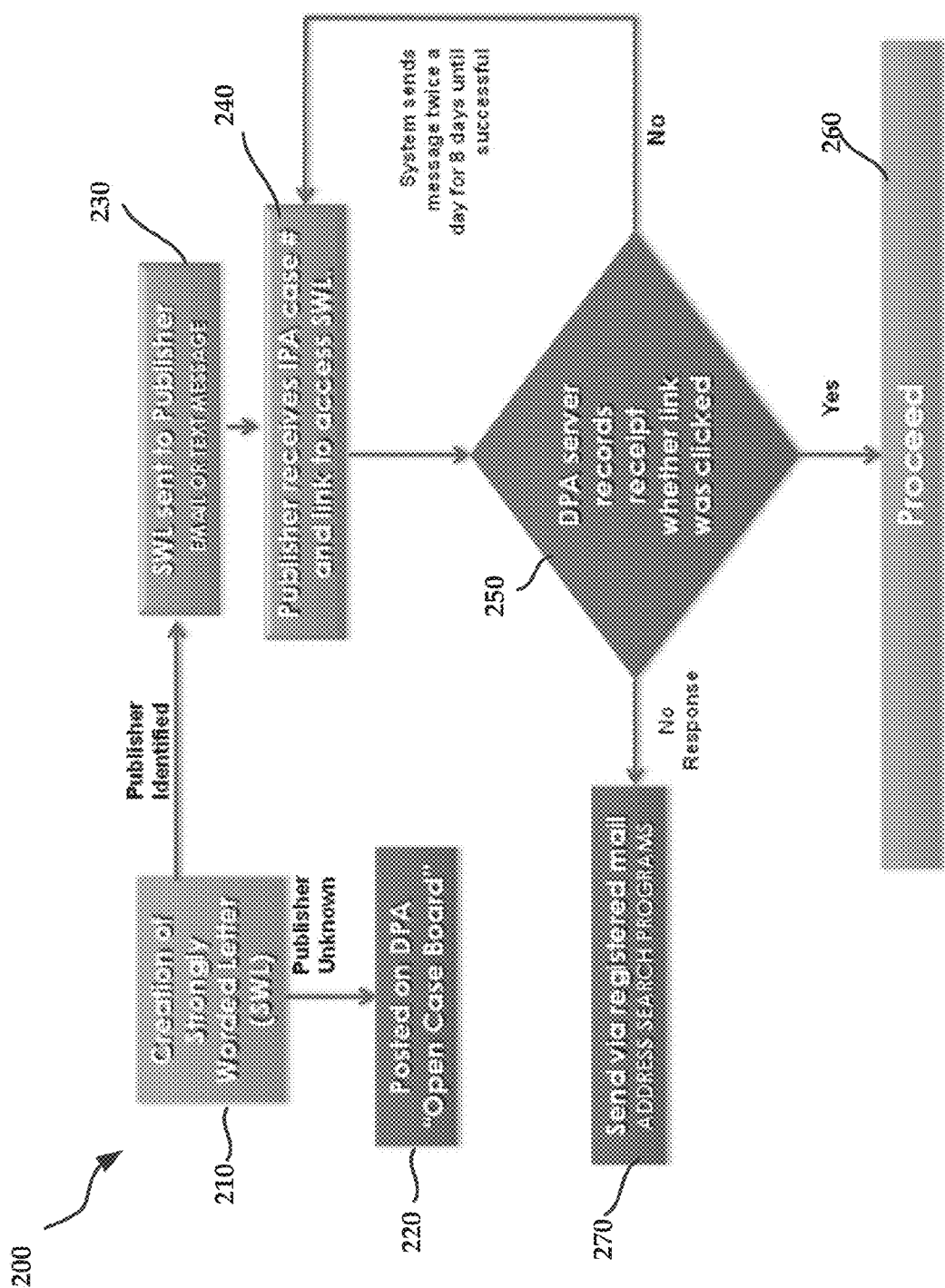
FIG. 2 is a flow chart illustrating an exemplary method

FIG. 2 illustrates a flow chart illustrating an exemplary method 200 of the present invention. The method that is illustrated in FIG. 2 depicts the method that follows after a complaint is received from a victim. After the receipt of such a complaint, method 200 begins with step 210, in which a strongly worded letter (SWL) addressed to the publisher of the unfavorable information is created. If the publisher of the unfavorable content is not known and/or not ascertainable from the information provided by the victim in the complaint, the SWL is posted on a publicly accessible Internet posting board (also referred to as a Digital Protection Authority (DPA) "Open Case Board") in step 220. Once the SWL is posted to the DPA Open Case Board, Internet users may visit the DPA Open Case Board and may be able to provide information that may lead to the uncovering of identity of the publisher and/or publishing entity. Additionally, Internet Service Providers (ISPs) and/or search engines (e.g. Google™, Yahoo!™ . . . etc.) may also visit the DPA Open Case Board to determine if the unfavorable content is hosted and/or searchable through the various services these entities provide.

If, in exemplary method 200, the publisher of the unfavorable material is identified in the complaint, or is identified in some other manner in which it allows the publisher to be contacted, the SWL is sent to the publisher in step 230 by electronic mail, text message, physical mail and/or any other similar method by which the publisher would likely receive the SWL. In some embodiments of the invention, the communication sent to the publisher in step 230 will contain a hyperlink or other means by which the publisher may receive an Digital Protection Authority (DPA) case number and a link to access the various document associated with the DPA case. These documents may include, but are not limited to, the SWL, a binding settlement agreement, a response form, and an agreement to arbitration form.

After the publisher receives the link sent in step 240, the Digital Protection Authority will determine and record in step 250 whether or not the publisher in receipt of the communication actually clicked on the link provided in the communication. If the recipient of the communication sent in step 230 does not click on the links provided in the communication, the method 200 may resend the communication in step 230 twice a day for eight days from the original communication date, or until the recipient of the communication clicks on the links provided.

Alternatively, after the publisher receives the link in step 240, the Digital Protection Authority will determine and record in step 250 whether or not the publisher in receipt of the communication actually clicked on the link provided in the communication. If the recipient of the communication does click on the links provided in the communication, but does not respond within the DPA server, the method 200 may send, in step 270, via registered mail or some other alternative method (e.g., FedEx or UPS), the communication provided in step 240 as well as the SWL created in step 210 to the recipient of the communication of step 240. The method 200 may utilize an address search program in order to determine the address of the recipient in step 270.

If, in step 250, the DPA server records an affirmative click of the link provided in the communication of step 240, and the recipient of the communication of step 240 responds to the various communications contained therein (e.g. the DPA case and the SWL), the method 200 may proceed along further avenues in step 260. These further avenues may include the publisher of the unfavorable material agreeing to remove the material voluntarily and/or digitally or physically signing an agreement to remove the unfavorable material.

Alternatively, the publisher of the unfavorable material may allege that the material is the truth and thus deny the request to remove the material. In such situations, step 260 may then proceed along the route to arbitration of the dispute by an independent arbitrator, who may be a lawyer, a retired lawyer, a judge, a retired judge, a licensed arbitrator, a law school graduate, or some other individual or panel qualified to hear disputes and arbitrate them fairly. In alternative embodiments, the arbitration process may be fully automated based on a proprietary rule or code.

In other embodiments of step 260 of method 200, the publisher of the unfavorable information may deny that he or she published the unfavorable information that is the subject of the method 200. In such situations, the method may allow for further investigation into the source of the published information, with or without the cooperation of the alleged publisher of the information. Alternatively, if the victim alleges that the publisher originally identified, and who is denying publishing the information, is indeed the publisher, then the method 200 may proceed along to arbitration as described above.

In yet further embodiments of step 260 of method 200, if the publisher does not agree to remove the unfavorable information, the victim may be presented with additional options. These options may include, but are not limited to, notifying the publisher's parents of the dispute, notifying the publisher's school of the dispute, notifying the publisher's employer of the dispute, notifying the police or local district attorney of the dispute, notifying the publisher's Internet Service Provider of the dispute. Each of the notifications of the dispute discussed above may include some or all information relating to the unfavorable published material, and may be followed by an arbitration process.

Figure 3:
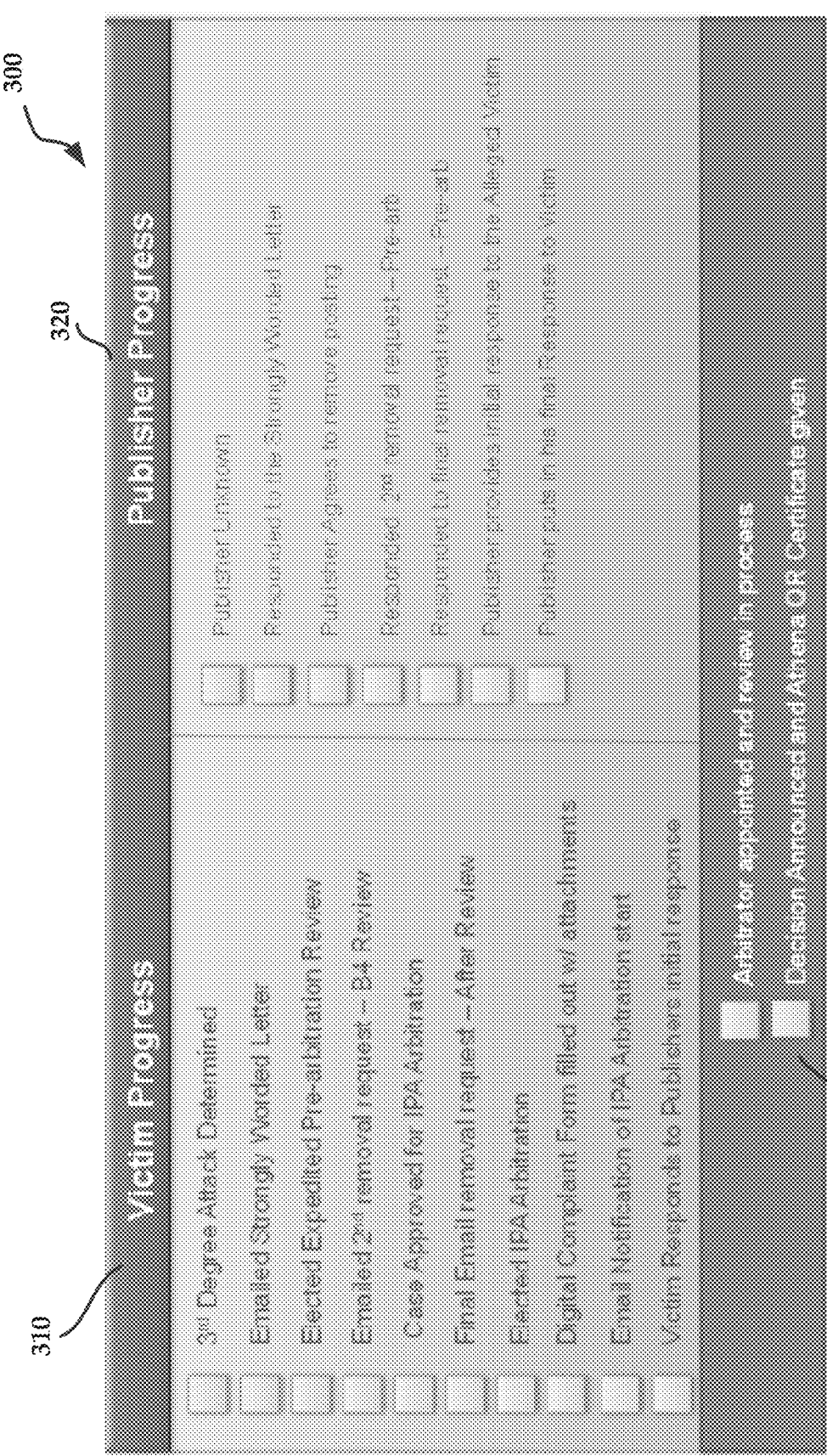
FIG. 3 is a screenshot of a progress chart illustrating an exemplary method.

FIG. 3 depicts a screenshot of a progress chart 300 illustrating an exemplary method of the present invention. Within the progress chart 300, there may reside a victim progress pane 310, a publisher progress pane 320 and an arbitration progress pane 330.

In certain embodiments of the invention, victim progress pane 310 may be populated with a number of different check boxes that may be filled in during the progression that occurs after the initial complaint is filed with the Digital Protection Authority. Victim progress pane 310 may show what level of attack has been determined, by the victim, the DPA and/or another party, to fit the unfavorable material that has been published online. Victim progress pane 31 may also inform a user when and if the SWL has been sent to the publisher, when the victim or the publisher has elected to pursue expedited pre-arbitration review, when the second removal request has been sent to the publisher, and/or when the complaint has been submitted and approved for arbitration at the Digital Protection Authority.

The pre-arbitration review process may include additional communications to the publisher, and/or may include an evaluation of the claim by a review person or persons that counsels a victim or victim representative to pursue, modify or drop a claim. The present embodiment may also include a system for addressing true but damaging publications, with a request for removal being based on fairness and morality. This equitable request may involve a different communication being sent to the publisher.

If, after the review process for expedited arbitration has been performed, victim progress pane 310 may also show when the final removal request has been sent to the publisher of the unfavorable material, and whether the publisher has elected to pursue arbitration at the Digital Protection Authority.

If it is has been determined that arbitration will take place at the Digital Protection Authority, victim progress pane 310 may further inform a user when a digital complaint form is filled out along with any attachments, when an notification has been sent out regarding when the arbitration will begin, and/or when the victim responds to the publisher's initial response in the arbitration.

In some embodiments of the invention, publisher progress pane 320 may also be populated with a number of different check boxes which may be filled in during the progression that occurs after the initial complaint is filed with the Digital Protection Authority. These check boxes may allow a user to quickly see whether or not the publisher of the unfavorable information is known, whether the publisher has responded to the strongly worded letter, and also whether the publisher has agreed to voluntarily remove the unfavorable material that has been published online.

Publisher progress pane 320 may also allow a user to quickly see whether the publisher has responded to the second removal request sent from the Digital Protection Authority, whether the publisher has responded to the final removal request sent from the Digital Protection Authority, whether the publisher has agreed to arbitration at the Digital Protection Authority, and/or whether the publisher has made any type of response to the victim of the unfavorable material that is published online.

In certain embodiments of the invention, arbitration progress pane 330 may allow a user to quickly determine whether an independent arbitration has been assigned to the arbitration process, whether an arbitration decision has been announced, and/or whether the victim of the unfavorable material has been vindicated with a Certificate of Vindication. Alternative indications of vindication may include emails, postings on a community board, and/or any other appropriate indication that a person's reputation has been vindicated by the process described herein.

Figure 4:
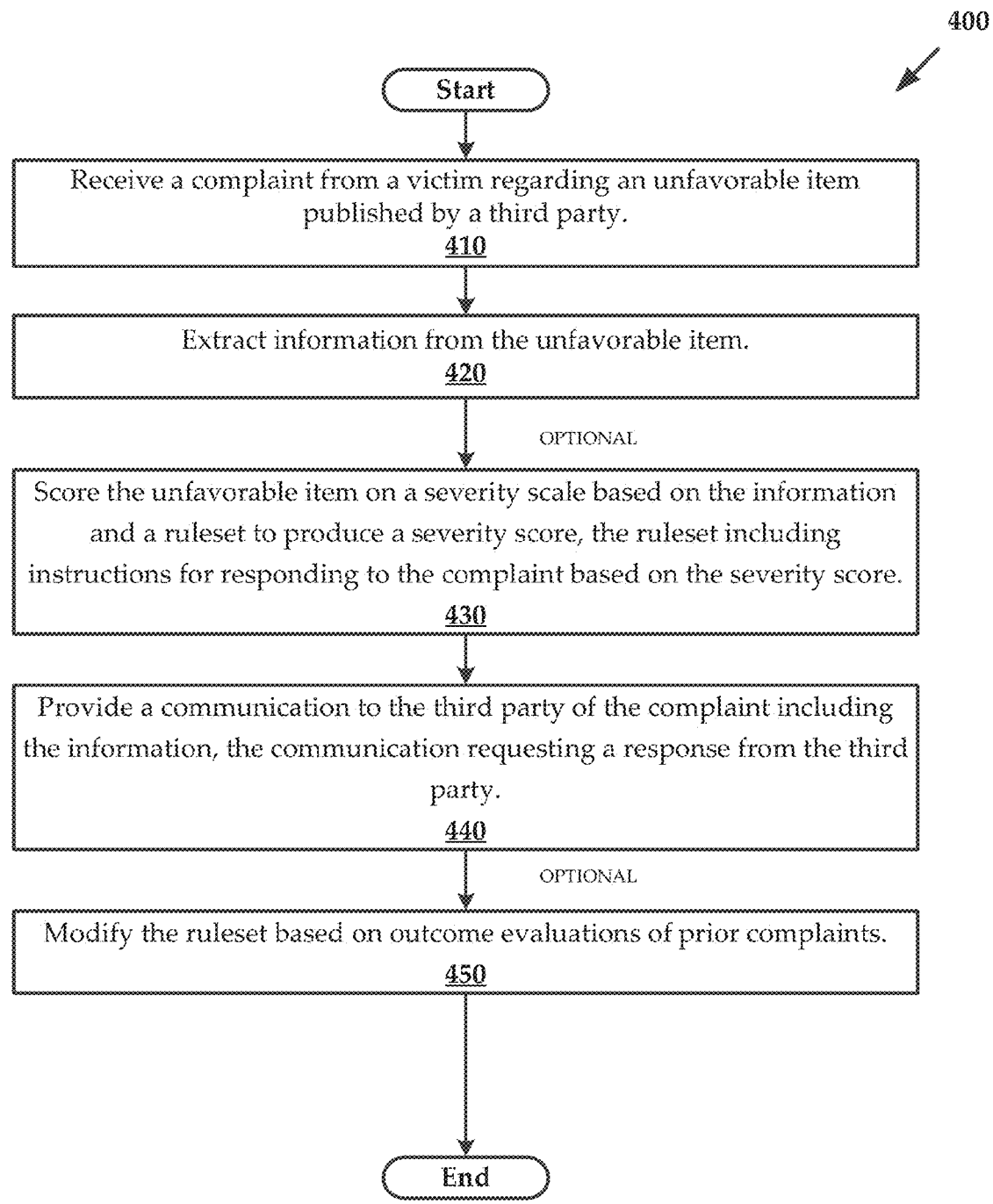
FIG. 4 is a flow chart illustrating an exemplary method.

FIG. 4 is a flow chart illustrating an exemplary method 400 of the present invention. At step 410, a system may receive a complaint from a victim regarding an unfavorable item published by a third party online. The unfavorable item may be published on the Internet in a number of different websites, including but not limited to, a social media site, a personal blog, a micro blogging site, and a website. The third party that published the unfavorable item may be an individual, a group of individuals and/or any other entity capable of publishing the unfavorable item online.

In step 420 of method 400, the system may extract certain information from the unfavorable item. The extracted information may include a picture, a video segment, a text segment, and an audio segment. An additional archiving operation may be performed prior to the extracting operation.

In optional step 430 of method 400, the system may score the unfavorable item on a severity scale based on the information and a ruleset to produce a severity score. The ruleset may include instructions for responding to the complaint based on the severity score. The response requested may include a number of choices from which the third party may choose in order to respond. These choices include, but are not limited to, asserting that the unfavorable item is true and declining to remove it, asserting that the unfavorable item is true but agreeing to remove it, denying responsibility for publishing the unfavorable item, agreeing with the communication and agreeing to remove the unfavorable item, and disagreeing with the communication and declining to remove the unfavorable item.

In step 440 of the method 400, the system may provide a communication to the third party of the complaint. The communication may include the extracted information. The communication to the third party of the complaint may also request a response from the third party.

In optional step 450 of method 400, the system may modify the ruleset based upon the outcome of previous complaints. This modification of the ruleset may be based upon, but not limited to, the language associated with previous complaints, the general characteristics of responses from the third parties to previous complaints, the results of previous complaints, the results of previous arbitration(s), the results of previous strongly worded letters, the results of previously providing information to ISPs, and the results of previously requesting that search engines remove certain terms and unfavorable material from search databases. Modifying the ruleset pursuant to optional step 450 may be performed continuously whenever a previous complaint has resolved, either in favor of or against a previous victim who filed a complaint.

Figure 5:
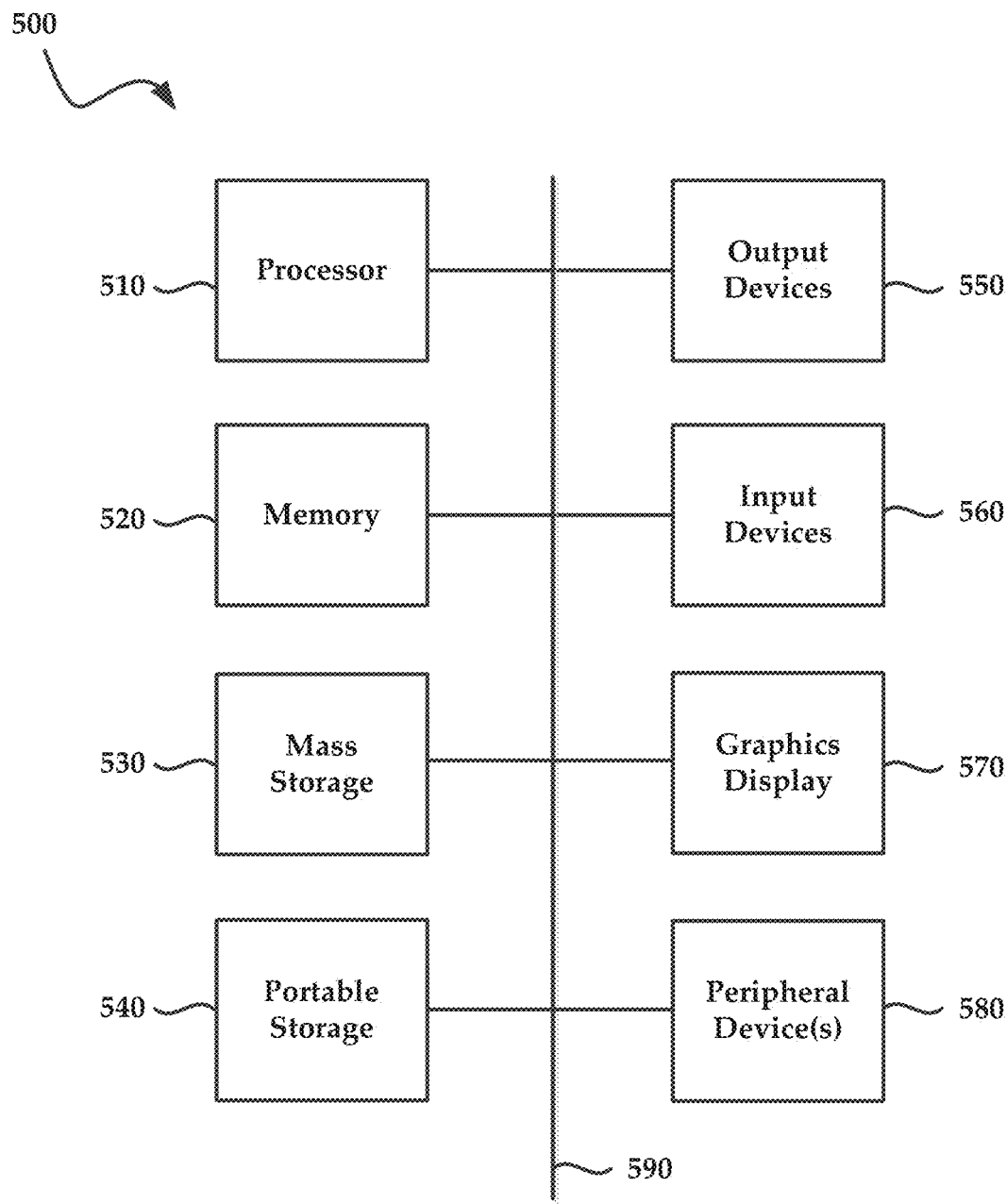
FIG. 5 is a schematic of a computer system according to an exemplary embodiment.

FIG. 5 illustrates an exemplary computing system 500 that may be used to implement an embodiment of the present technology. For example, data center 150, administrator terminal 130, network 110, customer terminal 140, and/or publisher terminal 120 may be implemented by one or more of the components of computing system 500. Additionally or alternatively, computing system 500 may be used to implement method 400 of FIG. 4. The computing system 500 of FIG. 5 includes one or more processors 510 and memory 520. Memory 520 stores, in part, instructions and data for execution by the one or more processors 510. Memory 520 can store the executable code when the computing system 500 is in operation. The computing system 500 of FIG. 5 may further include a mass storage 530, portable storage 540, output devices 550, input devices 560, a graphics display 570, and other peripheral device(s) 580.

The components shown in FIG. 5 are depicted as being connected via a single bus 590. The components may be connected through one or more data transport means. The one or more processor 510 and memory 520 may be connected via a local microprocessor bus, and the mass storage 530, peripheral device(s) 580, portable storage 540, and graphics display 570 may be connected via one or more input/output (I/O) buses.

Mass storage 530, which may be implemented with a magnetic disk drive or an optical disk drive, is a non-volatile storage device for storing data and instructions for use by processor 510. Mass storage 530 can store the system software for implementing embodiments of the present technology for purposes of loading that software into memory 520.

Portable storage 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the computer system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Figure 6:
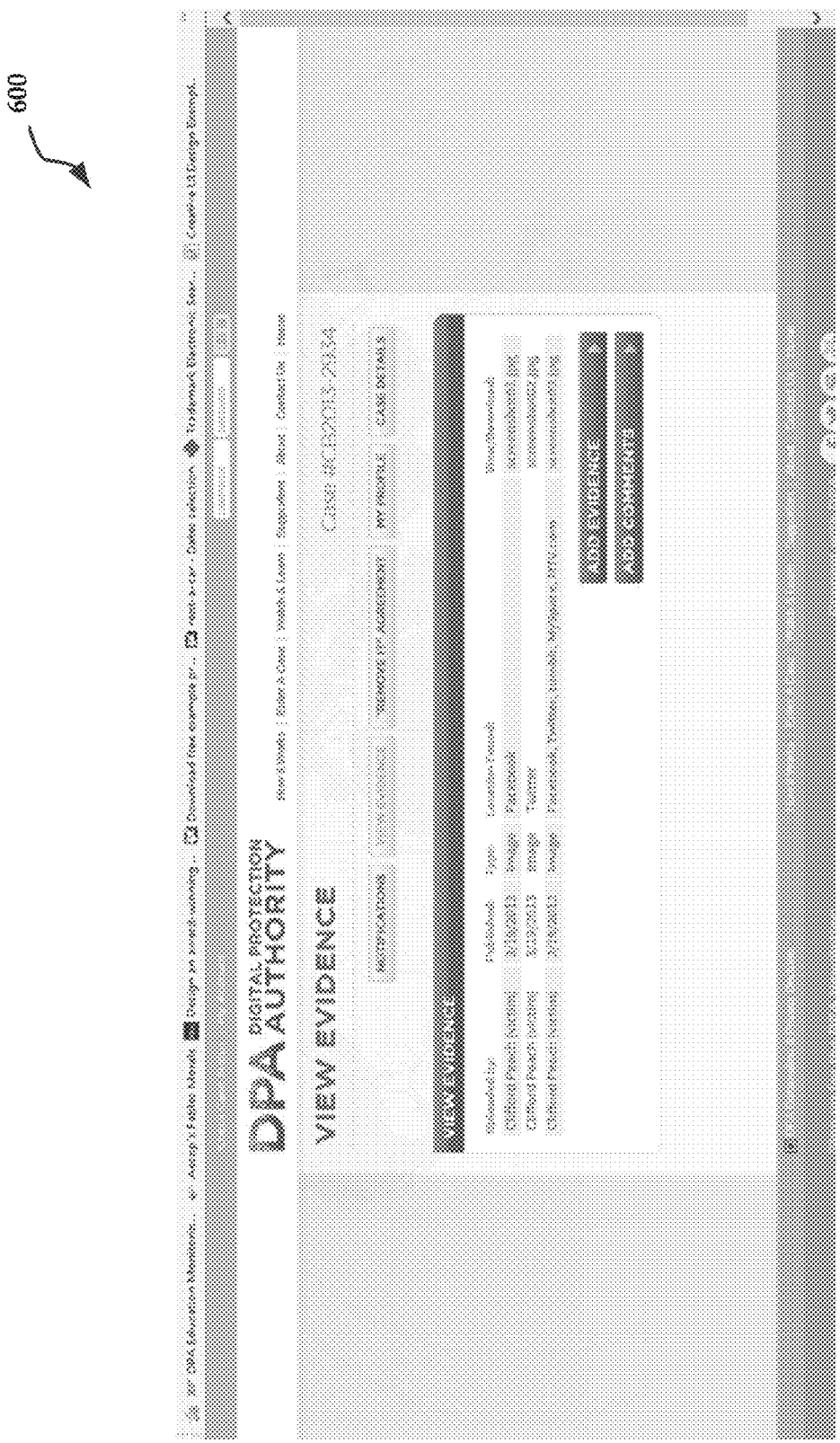
FIG. 6 is a screenshot of an online computer system according to an exemplary embodiment.

FIG. 6 is screenshot 600 of an online computer system according to an exemplary embodiment. Screenshot 600 illustrates an evidence review and upload interface. A user may view a set of previously uploaded evidence, delete items of evidence, upload additional evidence, and/or add comments to previously uploaded evidence using the online computer system illustrated in screenshot 600. After uploading evidence, a series of questions may be presented to the user to assist the system at arriving at a severity rating or score for the publication of the unfavorable item(s). The severity score may be based in part on the truth or falsity, or partial truth or falsity, of the unfavorable items. The questions presented to the user may be generated automatically based on an algorithm. In various exemplary embodiments, a user may initially score the unfavorable items on a severity scale indicating a level of offensiveness. The system may then re-score the unfavorable items based on the responses to the queries, information extracted from the unfavorable item(s), and or an algorithm or ruleset (alternatively referred to as an expert system).

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method, comprising:
   receiving a victim profile for a victim entity on a complainant interface;
   creating an advocate profile for a digital advocate for the victim entity;
   providing a set of sequence based questions to the victim entity to determine information for an unfavorable item published by one or more third parties on the complainant interface;
   receiving a filing of a complaint about the victim entity, the complaint being filed by the digital advocate;
   extracting information from the unfavorable item by parsing the complaint;
   populating a database with information regarding the complaint and the one or more third parties; and
   providing a communication to the one or more third parties of the complaint including the information extracted from the unfavorable item, the communication requesting a response from the one or more third parties.

2. The method of claim 1, further comprising scoring the unfavorable item on a severity scale based on at least one of the information extracted from the unfavorable item, responses to queries, and a ruleset to produce a severity score, the ruleset including instructions for responding to the complaint based on the severity score.

3. The method of claim 2, further comprising modifying the communication to the one or more third parties based on the severity score of the unfavorable item.

4. The method of claim 2, further comprising dynamically modifying the ruleset based on outcome evaluations of prior complaints, the outcome evaluations of prior complaints being generated automatically.

5. The method of claim 1, further comprising receiving and archiving the unfavorable item prior to the extracting of the information from the unfavorable item.

6. The method of claim 1, wherein the communication provides options for the response from the one or more third parties, the options comprising:
   removing the unfavorable item;
   denying the unfavorable item was published by the one or more third parties; and
   asserting the unfavorable item is true.

7. The method of claim 1, further comprising: performing a pre-arbitration review; and arbitrating the complaint by an objective arbitrator.

8. The method of claim 7, further comprising communicating to a digital service provider the complaint and a result of the arbitrating of the complaint.

9. The method of claim 7, further comprising outputting an indication of vindication when the arbitrating of the complaint results in a decision for the victim entity.

10. The method of claim 1, wherein the information extracted from the unfavorable item includes at least one of a picture, a video segment, a text segment, and an audio segment.

11. A system, comprising:
   a complainant interface comprising a victim entity identification section, an unfavorable item identification section, and a one or more third parties publisher identification section, the complainant interface displaying an initial severity score for an unfavorable item received in the unfavorable item identification section using a ruleset;
   an evidence review and upload interface that:
      receives evidence related to the unfavorable item; and
      provides a set of sequence based questions to a victim entity to determine information for the unfavorable item, based on the evidence;
   an expert system that rescores the initial severity score based on the evidence and answers to the set of sequence based questions;
   a communication module for;
      generating a strongly worded letter to one or more third parties a complaint, the strongly worded letter including the information extracted from the unfavorable item if a severity score of the unfavorable item meets or exceeds a threshold;
      transmitting a link to the one or more third parties which links to the strongly worded letter;
      determining whether the link has been clicked by the one or more third parties; and
      posting the strongly worded letter to an open case message board if the link has not been clicked within a given time period; and
   a modification module that updates the ruleset based on an outcome evaluation of the complaint and its resolution.

12. The system of claim 11, further comprising a scoring module for scoring the unfavorable item on a severity scale based on at least one of the information extracted from the unfavorable item, responses to queries, and a ruleset to produce a severity score, the ruleset including instructions for responding to the complaint based on the severity score.

13. The system of claim 12, further comprising a modification module for modifying a communication to the one or more third parties based on the severity score of the unfavorable item.

14. The system of claim 12, further comprising a modification module for modifying the ruleset based on outcome evaluations of prior complaints, the outcome evaluations of prior complaints being generated automatically.

15. The system of claim 11, further comprising an archiving module for receiving and archiving the unfavorable item prior to extracting the information from the unfavorable item by an extraction module.

16. The system of claim 11, wherein the communication module provides options for a response from the one or more third parties, the options comprising:
   removing the unfavorable item;
   denying the unfavorable item was published by the one or more third parties; and
   asserting the unfavorable item is true.

17. The system of claim 11, further comprising an arbitration module for performing a pre-arbitration review and arbitrating the complaint by an objective arbitrator.

18. The system of claim 17, wherein the communication module further communicates to a digital service provider the complaint and a result of the arbitrating of the complaint.

19. The system of claim 17, further comprising an output interface for outputting an indication of vindication when the arbitrating of the complaint results in a decision for a victim entity identified in the victim entity identification section.

20. The system of claim 11, wherein the information extracted from the unfavorable item includes at least one of a picture, a video segment, a text segment, and an audio segment.

21. A non-transitory computer readable storage medium having a program recorded thereon, the program when executed causing a computer to perform a method, the method comprising:
   creating a victim profile for a victim entity;
   creating an advocate profile for a digital advocate for the victim entity;
   providing a set of sequence based questions to the victim entity to determine information for an unfavorable item published by one or more third parties;
   extracting information from the unfavorable item;
   receiving a filing of a complaint about the victim entity, the complaint being filed by the digital advocate;
   populating a database with information regarding the complaint and the one or more third parties;
   providing a communication to the one or more third parties of the complaint including the information extracted from the unfavorable item, the communication requesting a response from the one or more third parties; and
   displaying a user interface that includes a progress chart that comprises a victim progress pane that illustrates a level of attack determined for the unfavorable item, a status of delivery of the communication, when a removal request for the unfavorable item has been sent, and combinations thereof.

22. The non-transitory computer readable storage medium of claim 21, further comprising scoring the unfavorable item on a severity scale based on at least one of the information extracted from the unfavorable item, responses to queries, and a ruleset to produce a severity score, the ruleset including instructions for responding to the complaint based on the severity score.

23. The non-transitory computer readable storage medium of claim 22, further comprising modifying the communication to the one or more third parties based on the severity score of the unfavorable item.

24. The non-transitory computer readable storage medium of claim 22, further comprising modifying the ruleset based on outcome evaluations of prior complaints, the outcome evaluations of prior complaints being generated automatically.

25. The non-transitory computer readable storage medium of claim 21, further comprising receiving and archiving the unfavorable item prior to the extracting of the information from the unfavorable item.

26. The non-transitory computer readable storage medium of claim 21, wherein the communication provides options for the response from the one or more third parties, the options comprising:
  removing the unfavorable item;
  denying the unfavorable item was published by the one or more third parties; and
  asserting the unfavorable item is true.

27. The non-transitory computer readable storage medium of claim 21, further comprising:
  performing a pre-arbitration review; and arbitrating the complaint by an objective arbitrator.

28. The non-transitory computer readable storage medium of claim 27, further comprising communicating to a digital service provider the complaint and a result of the arbitrating of the complaint.

29. The non-transitory computer readable storage medium of claim 27, further comprising outputting an indication of vindication when the arbitrating of the complaint results in a decision for the victim entity.

30. The non-transitory computer readable storage medium of claim 21, wherein the information extracted from the unfavorable item includes at least one of a picture, a video segment, a text segment, and an audio segment.

* * * * *